Alfred John ALEXANDER
Inventor

Attorney

Alfred John ALEXANDER
Inventor

United States Patent Office 3,525,861
Patented Aug. 25, 1970

3,525,861
FUNCTION GENERATOR WITH PULSE-WIDTH MODULATOR FOR CONTROLLING A GATE IN ACCORDANCE WITH A TIME-VARYING FUNCTION
Alfred J. Alexander, London, England, assignor to Elliott Brothers (London) Limited, London, England, a company of Great Britain
Filed Jan. 22, 1968, Ser. No. 699,439
Claims priority, application Great Britain, Jan. 20, 1967, 3,201/67
Int. Cl. G06f 15/34
U.S. Cl. 235—197         11 Claims

ABSTRACT OF THE DISCLOSURE

The following disclosure concerns a function generator operable to generate an electrical output signal as a function of one parameter which function is predetermined by a second parameter which is repetitively varying; according to the invention such a generator is provided by gate means operable to pass an input signal representing said second parameter for one or more intervals of time which are phase related to the input signal and determined by the one parameter. In a preferred form the gate means are controlled by a pulse-width modulator responsive to said one paramter.

---

This invention relates to improvements in function generators whereby an electrical signal may be generated as a function of an input parameter.

It is an object of the present invention to provide a function generator which shall be relatively economic to manufacture and which shall be capable of generating an electrical output signal as a function of one parameter which function is predetermined by a second parameter which is repetitively varying.

According to the present invention, a function generator operable to generate an electrical output signal as a function of one parameter which function is predetermined by a second parameter which is repetitively varying comprises gating means operable to pass an input signal representing said second parameter for one or more intervals of time which are phase related to the input signal and determined by the one parameter. Preferably an output unit is provided responsive to the output of the gating means to derive said output signal as an average of the gate output over one or more whole cycles of said second parameter.

Preferably, the gating means is opened to pass said input signal by the application thereto of a control wave, preferably a square wave, which is pulse-width modulated as a function of said one parameter.

With advantage, there is provided a wave generator operable to produce said control wave as a function of said one parameter, the control wave being applied to the gating means to enable the gating means for said one or more intervals of time.

Some embodiments of the invention will now be described by way of example, reference being made to the accompanying drawings in which.

Figure 1:
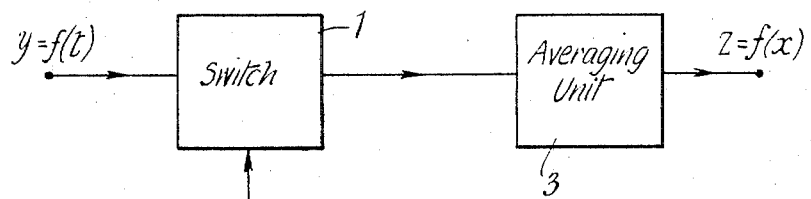
FIG. 1 is a block diagram illustrating a function generator according to the present invention.
Figure 1:
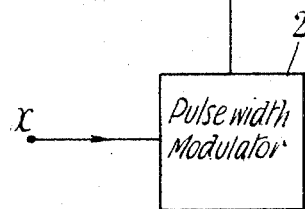

The function generator illustrated in FIG. 1 basically comprises three units, namely, a switch or gate 1, a pulse-width-modulating device 2 connected to the gate 1 to switch the latter from the non-conducting to the conducting condition and an output unit 3 which is supplied with the output from the gate 1 and which may be an averaging unit or an integrator depending on whether repetitive or "single-shot" operation is required. In some cases the output unit 3 may not be required, the switch output signal being used directly without smoothing.

A first input signal $x$ representing one parameter is applied to the pulse-width-modulating device to produce a pulse train the individual pulses of which have a duration representing the magnitude of the first input signal and operate to switch the gate 1 from the non-conducting to the conducting condition for this duration. A second input signal $y$ representing a second parameter is applied to the gate 1 and is passed thereby to the output unit 3 for the periods of conduction of the gate 1. The input signal $y$ is a repetitively varying signal of the form $y=f(t)$ and the input signal $x$ is a D.C. signal or a signal which varies but slowly in relation to the signal $y$ so that it may be considered substantially constant during each period of conduction of the gate 1. The average value Z of the output from the gate 1, i.e. the output of the unit 3 is proportional to a function of the signal $x$ which function is determined by the signal $y$.

Expressed mathematically, the area under the curve $y=f(t)$ from time $t=t_1$ to $t=t_2$ is given by $$\int_{t_1}^{t_2} f(t)\,dt = F(t_2) - F(t_1)$$

where $F(t)$ signifies $\int f(t)\,dt$.

By a suitable choice of input waveform for $y=f(t)$ and of $t_1$ and $t_2$ the expression $F(t_2)-F(t_1)$ can be made proportional to any required function. As will be appreciated, the choice of time $t=t_1$ involves phase relating the opening of the gate 1 to the input signal $y$.

Figure 2:
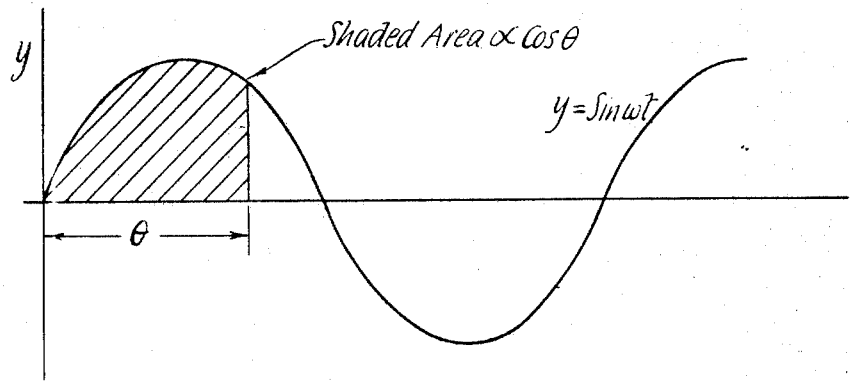
FIG. 2 is a waveform illustrative of one mode of operation of the function generator of FIG. 1.

As one example, consider the input waveform shown in FIG. 2 where $y \propto \sin wt$ and $t_1=0$.

The shaded area represents the output signal $z$ and $z \propto \cos(1-\cos W\theta)$, where $\theta \propto x$.

Figure 3:
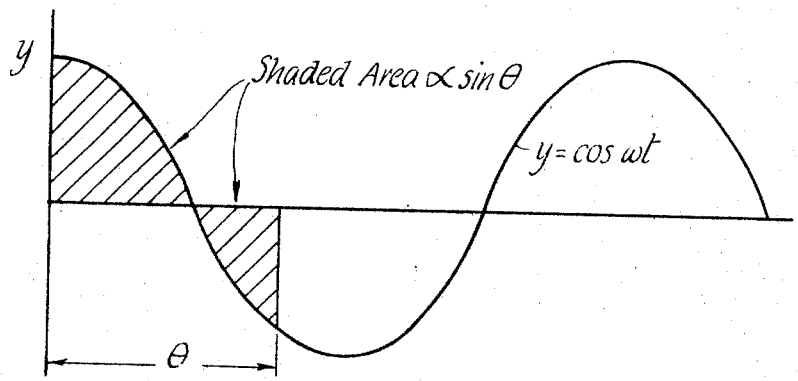
FIG. 3 is a waveform illustrative of another mode of operation.

In this case $t_1=0$ but $t_1$ is chosen as $\pi/2$ then we have the cosine waveform shown in FIG. 3 and $Z \propto \sin W\theta$, where $\theta \propto x$.

In the above described examples, only one cycle of the sine wave has been considered and accordingly, the range of operation is limited to one cycle $0 \leqslant \theta \leqslant 360°$. By arranging the pulse width modulator to operate at some subharmonic of the sinusoid, the range of operation can be extended to any integral number of cycles.

Figure 4:
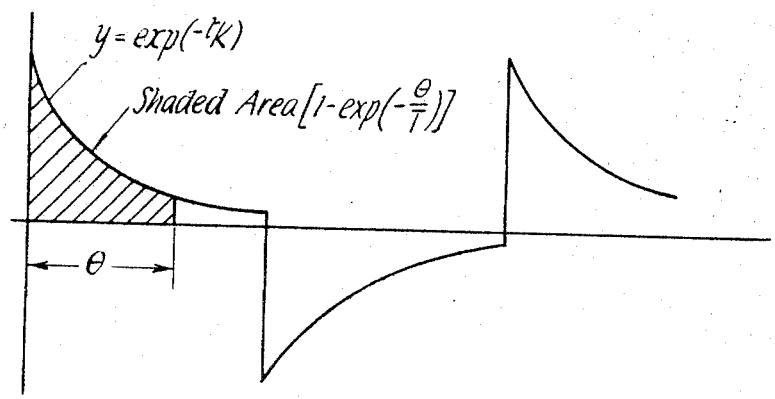
FIG. 4 is a waveform illustrative of a further mode of operation.

FIG. 4 illustrates an input waveform $y$ which is a "quasi-differentiated" square wave. If $t_1$ is made to occur at a step in the square wave from which the waveform is derived then $$Z \alpha \left[1 - \exp\left(-\frac{\theta}{T}\right)\right]$$

where $\theta \alpha x$.

Again, if the input signal $y$ is a filtered square wave derived from a filter having the function $$\frac{1}{1+ST}$$

and $t_1$ occurs at a step in the square wave, then with $t_2-t_1 \alpha x$, we have Z of the form $(1+x-e^x)$.

It will be appreciated that many other output functions can be derived from the generator of the present invention.

Figure 5:
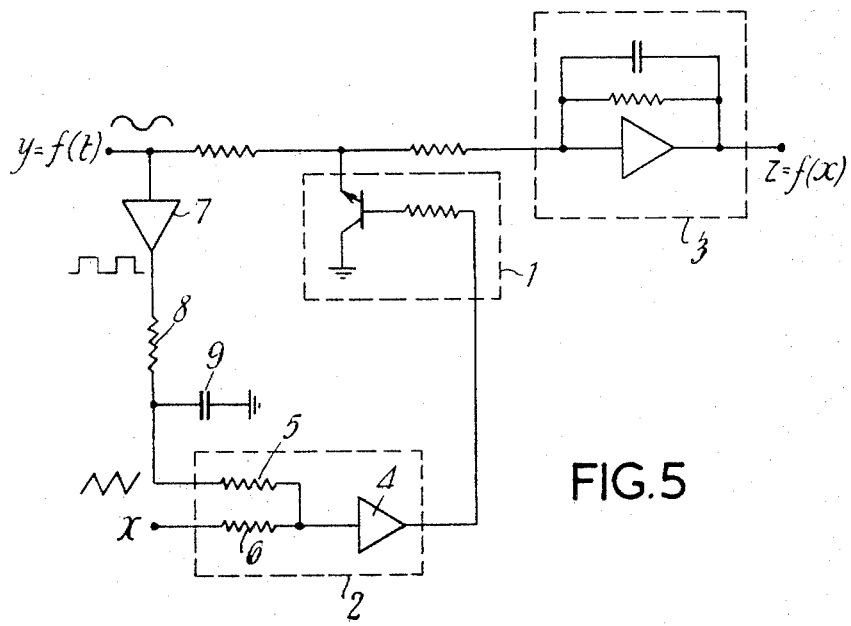
FIG. 5 is a block diagram illustrating a form of sine function generator according to FIG. 1 in greater detail.

FIG. 5 shows an arrangement similar to FIG. 1 but in greater detail for the case of the sine function generator. Like reference numerals are used to denote like parts. In this case, the switch or gate 1 is a conventional shunt transistor switch. The averaging unit 3 is an operational amplifier giving a lag with a transfer function of the form $$\frac{1}{1+ST}$$

where S is the Laplace operator and T is the RC time constant of the associated resistor and capacitor connected thereacross. The pulse-width-modulating device 2 comprises a high gain amplifier 4 with resistors 5 and 6 in its input circuit. In order to phase relate the generated pulse train to the input signal $y$ and assuming $y$ is a cosine waveform, the input $y$ is applied to a squaring amplifier 7 which produces a square wave having a repetition frequency corresponding to the frequency of the signal $y$. This square wave is then passed through an integrator 8, 9 to derive a triangular waveform from the square wave and this triangular waveform is applied to the resistor 5. The first input signal $x$ is applied to the resistor 6 and the resistors 5 and 6 operate to compare the signal $x$ with the triangular waveform and to operate the amplifier 4 to initiate a pulse to the switch 1 for a time interval determined by such comparison and primarily by the magnitude of the signal $x$. As the triangular waveform is phaselocked to the input signal $y$, so is the pulse train output of the device 2.

It should be appreciated that although $t_1$ is not now a fixed point of the waveform $y$, it is varying (relative to the waveform $y$) in a direction opposite to the point $t_2$. A sine function is generated since:

$$\int_{-t_2}^{+t_2} \cos wt\, dt = 2 \sin wt_2$$

In the case of the cosine generator however the corresponding expression is:

$$\int_{-t_2}^{+t_2} \sin wt\, dt = 0$$

and it is necessary to modify the circuitry employed. The modification consists in employing an "exclusive or" gate to drive the switch (unit 1). One input of the latter gate is the pulse width modulated output from unit 2 and the other is the square wave being supplied to the integrator 8, 9. The output of the "exclusive or" gate causes the pulse width modulated signal to reverse at alternate half cycles so that the switch 1 is "on" from the beginning of a cycle of the triangular wave, say at $t=0$, to a time interval $\alpha\theta$; "off" from $t=\theta$ to $t=180°$ "on" from $1=180°$ to $t=(360°-\theta)$; and "off" from $t=(360°-\theta)$ to $t=360°$.

The output Z may then be expressed as:

$$\int_\theta^\theta \sin wt\,dt + \int_{180°}^{(360°-\theta)} \sin wt\,dt = -2\cos w\theta$$

where $2\theta$ is the basic pulse width.

It is to be appreciated that a further series of output functions can be generated if the triangular waveform is replaced by a different function. For example, if input $y$ is made sinusoidal and the input to the resistor 5 is a quasi-differentiated square wave, then the output Z would be a function of the form sin ($\log_e x$). Thus, referring back to FIG. 1, it will be seen that outputs Z of the greater complexity then those described with reference to FIGS. 2, 3 and 4 can be achieved with inputs $x$ which vary independently of time.

Figure 6:
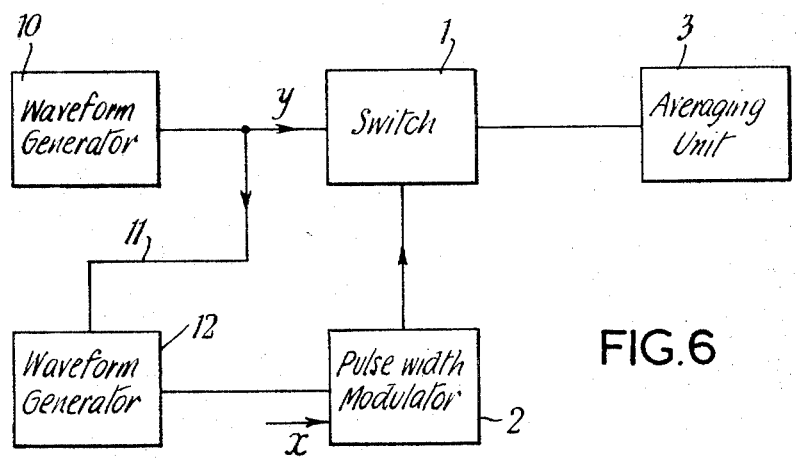
FIG 6 is a block diagram similar to FIG. 1 including waveform generators.

FIG. 6 is a block schematic of the complete device general similar to unit 10) which derives the waveform generator 10 to derive the waveform $y$ and to synchronize by an input 11 another waveform generator 12 (not in general similar to unit 10) which derives the waveform for the pulse-width-modulator 2, also supplied with input $x$. The other parts are similar to those shown in FIG. 1 and will not be redescribed.

It will be appreciated that the waveform generator 12 could be free running and arranged to synchronize generator 10. In yet another arrangement both waveform generators could be synchronized from a common external source.

I claim:

1. A function generator operable to generate an electrical output signal as a function of one parameter, said function being predetermined by a second parameter, comprising:
   gating means having first and second inputs and having an output,
   a first waveform generating means connected to said first input of said gating means and operative to generate one cyclically repetitive waveform signal representative of said second parameter,
   a second waveform generating means operative to generate a further cyclically repetitive waveform signal in a predetermined phase relationship to said one signal, and
   a pulse-width modulator having one input which is connected to the output of said second generating means, a second input which is arranged to be connected to a source of an electrical signal representative of said one parameter, and an output for a signal which is pulse-width modulated in accordance with said one parameter, said output of said pulse-width modulator being connected to the second input of said gating means for operating said gating means to pass said one signal at a cadence determined by the repetition frequency of said further signal and for a duration determined by said one parameter.

2. A function generator as defined in claim 1 wherein said first generating means comprises a free-running oscillator, and said second generating means comprises a waveform shaping means connected between the output of said first generating means and said one input of said pulse-width modulator.

3. A function generator as defined in claim 1 wherein said first generating means comprises a free-running oscillator, and said second generating means comprises an oscillator synchronized by said first generating means.

4. A function generator as defined in claim 1 wherein said second generating means comprises a free-running oscillator and said first generating means comprises an oscillator synchronized by said second generating means.

5. A function generator as defined in claim 1 wherein said first and second generating means each comprises an oscillator arranged to be synchronized by a common external signal source.

6. A function generator as defined in claim 1, further comprising an output unit connected to said output of said gating means, said output unit being arranged to derive an average of the output of said gating means over one or more whole cycles of said second parameter.

7. A function generator as defined in claim 1 wherein said second generating means is arranged to generate a square-waveform signal.

8. A function generator as defined in claim 1 wherein said second generating means is arranged to generate a triangular-waveform signal.

9. A function generator as defined in claim 1 wherein said second generating means is arranged to generate a quasi-differentiated square-waveform signal.

10. A function generator as defined in claim 1 wherein said first generating means is arranged to generate a sinusoidal-waveform signal.

11. A function generator as defined in claim 1 wherein said first generating means is arranged to generate a quasi-differentiated square-waveform signal.

(References on following page)

References Cited

UNITED STATES PATENTS

| | | | |
|---|---|---|---|
| 3,013,724 | 12/1961 | Thompson et al. | 235—194 |
| 3,057,555 | 10/1962 | Case | 235—194 X |
| 3,358,129 | 12/1967 | Schultz | 235—194 |
| 3,454,753 | 7/1969 | Widrow et al. | 235—194 |
| 2,643,819 | 6/1953 | Lee et al. | 235—181 |
| 2,718,449 | 9/1955 | Piety et al. | 328—135 X |
| 3,036,775 | 5/1962 | McDermid et al. | 235—181 |
| 3,277,290 | 10/1966 | Martinez | 235—197 |
| 3,426,187 | 2/1969 | Partridge | 235—197 |
| 3,350,643 | 10/1967 | Webb | 328—151 X |
| 3,369,185 | 2/1968 | Carter | 329—50 |
| 3,428,794 | 2/1969 | Norsworthy | 235—181 |

EUGENE G. BOTZ, Primary Examiner

R. W. WEIG, Assistant Examiner

U.S. Cl. X.R.

235—184, 194; 328—151